Jan. 1, 1924

P. R. BASSETT

LIGHT PROJECTING APPARATUS

Filed June 11, 1920

1,479,640

INVENTOR
PRESTON R BASSETT
BY
Herbert H. Thompson
HIS ATTORNEY

Patented Jan. 1, 1924.

1,479,640

UNITED STATES PATENT OFFICE.

PRESTON R. BASSETT, OF BROOKLYN, NEW YORK, ASSIGNOR TO THE SPERRY GYROSCOPE COMPANY, OF BROOKLYN, NEW YORK, A CORPORATION OF NEW YORK.

LIGHT-PROJECTING APPARATUS.

Application filed June 11, 1920. Serial No. 388,193.

*To all whom it may concern:*

Be it known that I, PRESTON R. BASSETT, a citizen of the United States of America, residing at 1716 Newkirk Avenue, Brooklyn, in the county of Kings and State of New York, have invented certain new and useful Improvements in Light-Projecting Apparatus, of which the following is a specification.

The objects and advantages will appear as the description of the invention is hereinafter developed.

Referring to the drawings wherein I have shown what I now consider to be the preferred forms of my invention:

Figure 1:
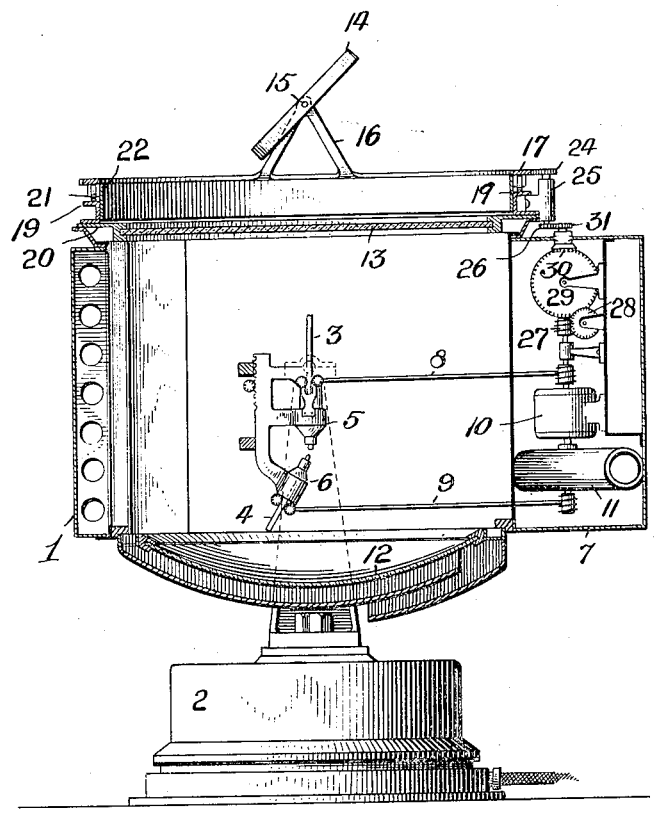
Fig. 1 is a side elevation of a searchlight apparatus equipped with means for projecting simultaneously a vertical and a horizontal beam, the searchlight casing being shown in section.

While my invention is not limited to use with any particular light source, I have shown it as applied to a searchlight. In Fig. 1 the searchlight casing 1 is shown pivotally mounted for turning about a horizontal axis in the usual manner upon a base 2. Within the casing are the positive and negative electrodes 3 and 4 supported in the electrode holders 5 and 6, respectively. Suitable means may be mounted in the control box 7 for rotating the electrodes continuously and may comprise shafts 8 and 9 driven by a motor 10 in the control box and serving to drive suitable gearing adjacent the electrodes in a manner well known in the art, such, for instance, as shown in the patent to E. A. Sperry, No. 1,282,133, granted October 22, 1918. Said motor 10 may also serve to drive an exhaust blower 11 for ventilating and cooling the searchlight. The searchlight apparatus may be of any of various types well known in the art and further description thereof is hence unnecessary. The crater of the positive electrode 3 is preferably positioned at the focal point of the mirror 12, which is located at the rear of the searchlight casing and serves to project a beam of light through the transparent front 13 of the searchlight. In Fig. 1 the searchlight is turned about its horizontal axis of support into a position such that the beam of light is projected vertically upward.

For reflecting a more or less horizontal beam of light, I have shown a circular plane mirror 14 mounted over the central portion of the transparent door 13. Said mirror 14 is provided with suitable trunnions 15, 15 mounted to turn about a horizontal axis in bearings on standards 16, 16 carried by a ring member 17. Mirror 14 may thus be turned to various angles with respect to the horizontal and may be clamped in adjusted position by means of suitable wing nuts 18, 18. Member 17 is shown rotatably mounted on another ring member 19, secured to the front door rim 20. Suitable anti-friction rollers 21 are shown mounted on member 17 for supporting the latter on member 19. An annular member 22 secured to ring 19 extends adjacent ring 17 as shown and serves to maintain rollers 21 in engagement with the ring member 19.

For distinguishing the beacon from other beacons I may rotate ring member 17 continuously at a definite and distinctive rate during the operation of the beacon and to this end I have shown the outer edge of said member provided with gear teeth 23. Meshing with said teeth is a pinion 24 mounted on a shaft rotatably mounted in a bracket 25 on ring member 19, said shaft carrying a pinion 26. The latter pinion may be driven from motor 10 in any suitable way, such as the train of gears 27—31, inclusive.

It will now be seen that the mirror 14 intercepts light from the center of the vertical beam and projects such light horizontally or at any desired angle to the horizontal, depending upon the position to which mirror 14 is adjusted. By mounting the mirror 14 over the central part of the vertical beam two important advantages are gained. First, it is desirable that the horizontal beam have a noticeable beam spread, preferably more than five degrees, and by utilizing the central portion of the vertical beam, which is the portion of greatest spread, the maximum spread of the horizontal beam is obtained. Secondly, the vertical beam should be as concentrated as possible or, in other words, should have a minimum spread. The outer portions of mirror 12 produce the most parallel rays and give the most concentrated beam, so that the intensity and concentration of the vertical beam are not materially affected by withdrawing part of the beam at its central portion. It is found that a powerful horizontal beam may thus be obtained and that it intercepts only about fifteen per cent of the vertical beam, which does not perceptibly reduce the intensity of the vertical beam itself.

The beacon may be distinguished from other beacons by rotating mirror 14 at a rate different from the rate of rotation of the rotatable mirrors at the other beacons. By assigning to each beacon a distinctive and definite rate of rotation of the horizontal beam the aviator is enabled to determine his location by noting the number of revolutions per minute of the horizontal beam, or the number of seconds between flashes. Another method of distinguishing the beacon is to provide a distinctive number of flashes per revolution, as by providing mirror 14 with a definite number of reflecting surfaces at an angle to each other.

Figure 3:
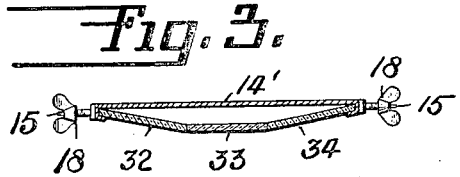
Fig. 3 is a sectional view of an alternative form of reflecting means which may be used in connection with the apparatus of Fig. 1.
Figure 2:
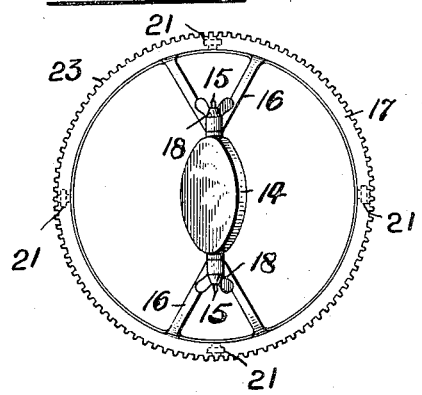
Fig. 2 is a plan view of certain parts shown in Fig. 1.

In Fig. 3, the mirror 14' is shown provided with three reflecting surfaces 32, 33, and 34 angularly positioned with respect to each other. When this mirror is rotated, the observer will receive three quick flashes for each revolution instead of a single flash.

In accordance with the provisions of the patent statutes, I have herein described the principle of operation of my invention, together with the apparatus, which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In combination with a searchlight, means at the rear of said searchlight for projecting a beam of light in a given direction, a rotatable reflecting means at the front of the searchlight in the path of only a portion of said beam, and power means for simultaneously rotating said reflecting means and ventilating said searchlight.

2. An aviation beacon comprising a source of light, means for projecting a beam from said source in one directon, means comprising a plurality of angularly positioned reflecting surfaces for intercepting only a portion of said beam and reflecting said portion in different directions and means for rotating said second mentioned means about the axis of said first mentioned means.

3. An aviation beacon comprising a searchlight having means at the rear thereof for projecting a beam of light, a support at the front of said searchlight and rotatable about an axis extending longitudinally of the searchlight, means for rotating said support about said axis, and reflecting means carried by said support at an angle thereto and positioned in the path of only a part of said beam, said reflecting means comprising a plurality of surfaces angularly positioned with respect to each other.

4. An aviation beacon comprising a searchlight, means at the rear of said searchlight for projecting a beam of light, means comprising a plurality of angularly positioned reflecting surfaces positioned in front of the searchlight for intercepting only a portion of the beam and reflecting said portion in different directions and means for rotating said second mentioned means about the axis of said beam.

5. In a beacon, a lamp housing, lamp mechanism therein, means for actuating said mechanism, a projector positioned in the rear of said housing, a reflector positioned without the front of said housing and adapted to intercept a portion only of the beam projected by said projector, said reflector being adapted to be rotated by said first mentioned means.

In testimony whereof I have affixed my signature.

PRESTON R. BASSETT.